Figure 1:
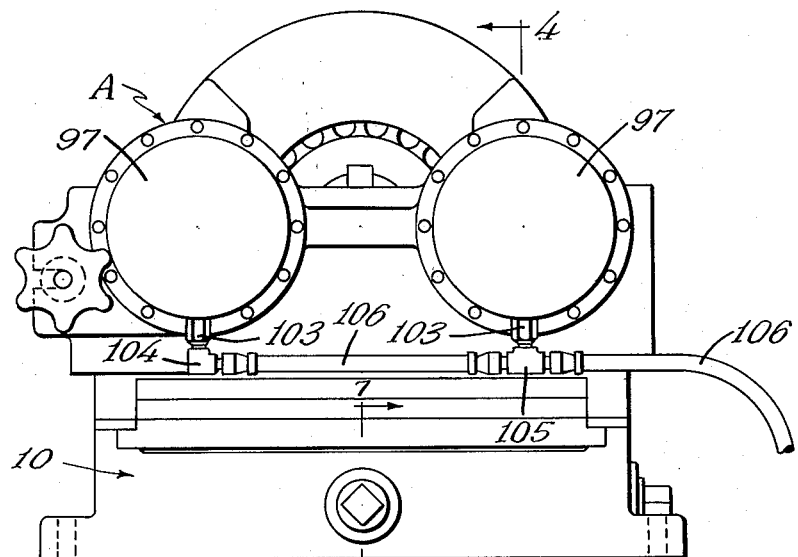

July 11, 1961 M. E. ERICKSON 2,991,849
DISC BRAKE

Filed Oct. 21, 1958 3 Sheets-Sheet 1

INVENTOR
Milton E. Erickson
BY Robert M. Dunning
ATTORNEY

July 11, 1961        M. E. ERICKSON              2,991,849
                       DISC BRAKE
Filed Oct. 21, 1958                          3 Sheets-Sheet 2

INVENTOR
Milton E. Erickson
BY
ATTORNEY

July 11, 1961  M. E. ERICKSON  2,991,849
DISC BRAKE
Filed Oct. 21, 1958  3 Sheets-Sheet 3

INVENTOR
Milton E. Erickson
BY Robert M. Dunning
ATTORNEY

United States Patent Office 2,991,849
Patented July 11, 1961

2,991,849
DISC BRAKE

Milton E. Erickson, Minneapolis, Minn., assignor to Horton Manufacturing Co., Inc., Minneapolis, Minn., a corporation of Minnesota
Filed Oct. 21, 1958, Ser. No. 768,757
10 Claims. (Cl. 188—72)

This invention relates to an improvement in disc brake and is designed to provide a friction brake which will apply friction to a brake disc attached to a rotatable shaft.

In the handling of flexible webs such as webs of paper and the like it is often necessary to apply a braking force to a shaft or roll about which such webs are wound. For example, in paper laminating machines, paper corrugating machines and the like, the rolls of paper are supported upon shafts which rotate with the roll and a braking force is applied to the shaft in order to provide tension upon the web. These shafts are usually mounted in top opening bearings, so that the shafts may be lifted from, or lowered into the bearings by a yoke hoist. The present device comprises a simple and effective brake for use in such applications and for similar uses.

One of the difficulties often experienced with devices of this type lies in the difficulty in mounting the brake so that the supported shaft is exactly parallel to the various other shafts supporting rollers over which the web may be trained. Another difficulty with such devices lies in the fact that it is advantageous to use a shaft for supporting the roll of material having a brake disc which is securely fastened thereto. The rolls are mounted upon these shafts before being inserted into the apparatus. Difficulty is often experienced in mounting the shafts properly in the brakes in a minimum of time. It is an object of the present invention to avoid these previous difficulties.

A feature of the present invention resides in the provision of a disc brake of the type described which includes a base which slidably supports a first carriage which is movable in a direction axially of the shaft to provide an adjustment in this direction. A second carriage is slidably supported upon the first carriage for movement in a direction at right angles to the direction of movement of the first carriage so that the shaft may be adjusted longitudinally of the direction of movement of the web as it leaves the roll, and relative to the other supporting bearing. This adjustment permits the aligning of the shaft into parallel relation with other shafts supporting rolls over which the web must travel.

A further feature of the present invention resides in the provision of a device of the type described including an open top and having a fixed side supporting brake shoes against which the disc may be urged. The opposite side of the support is hingedly mounted on a substantially vertical axis so that it may be hinged away from the fixed side. Thus, the brake disc is supported upon suitable bearings on the fixed side of the housing while the opposite side of the housing is open to simplify the positioning of the disc.

A further feature of the present invention resides in the provision of a generally rectangular box like enclosure for a brake disc having an open top and having a hinged side opposite the side which acts to support the shaft. When the hinged side is swung into open position, the disc may be dropped into place in the housing and into the open top opposed bearing much more quickly than would be possible if all of the sides of the housing were fixed due to the greater tolerance provided by the open side. As the hinge side is moved into closed position, the brake drum on the shaft and the shaft may be moved axially to the extent necessary to engage against the fixed shoes on the fixed side of the housing, the shaft and brake drum being always axially moveable.

It will be understood that the shafts on which the brake drums are mounted are usually heavy shafts and are designed to support rolls of sheet material several feet in diameter. These shafts are usually handled by overhead cranes equipped with hooks engaging the shaft on opposite sides of the roll. As the shafts are lowered into place, considerable less time is required if the distance between the brake shoes engaging opposite sides of the brake disc is increased. By providing a hinged side on the housing, the rolls may be readily lowered until the brake disc is within the housing, and then moved laterally until the brake discs are against the fixed shoes thus properly locating the shafts in considerably less time than is usually required to lower the brake disc between opposed pairs of shoes.

These and other objects and novel features of the present invention will be more clearly and fully set forth in the following specification and claims.

Figure 2:
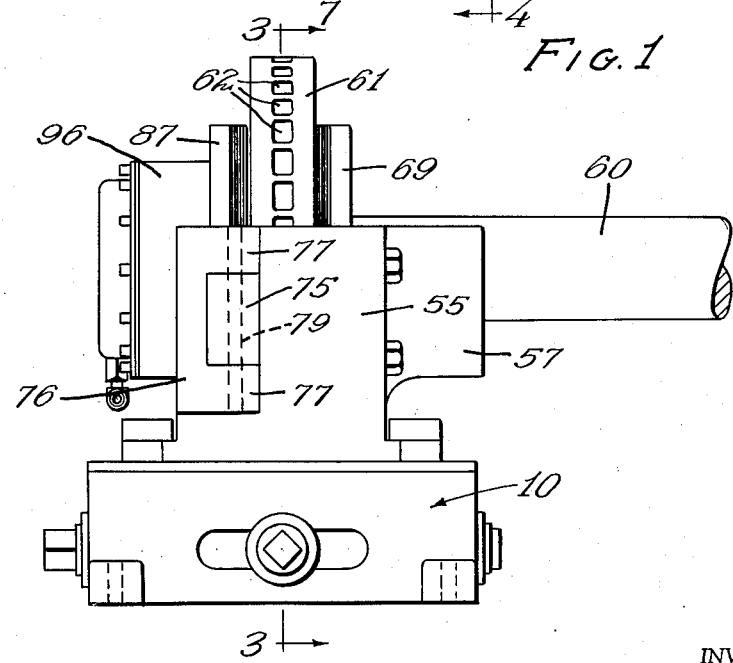
Figure 3:
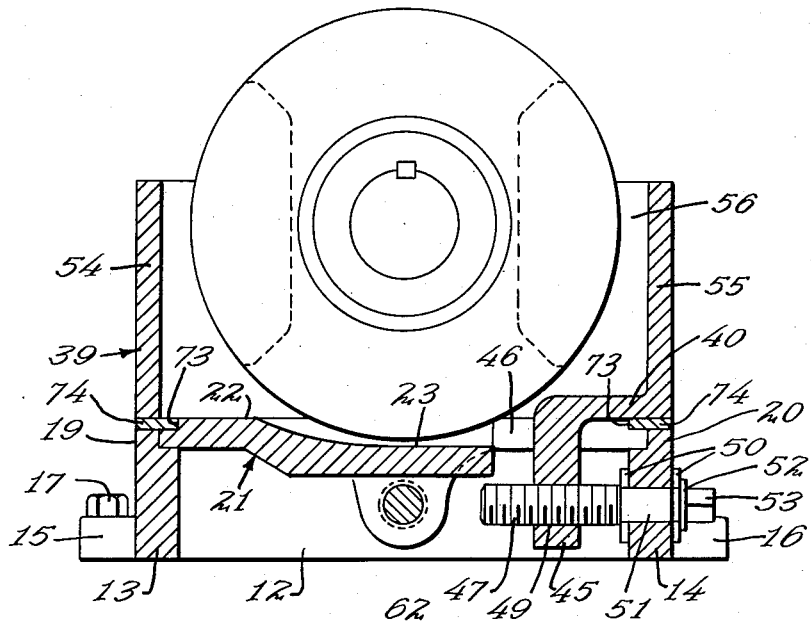
Figure 4:
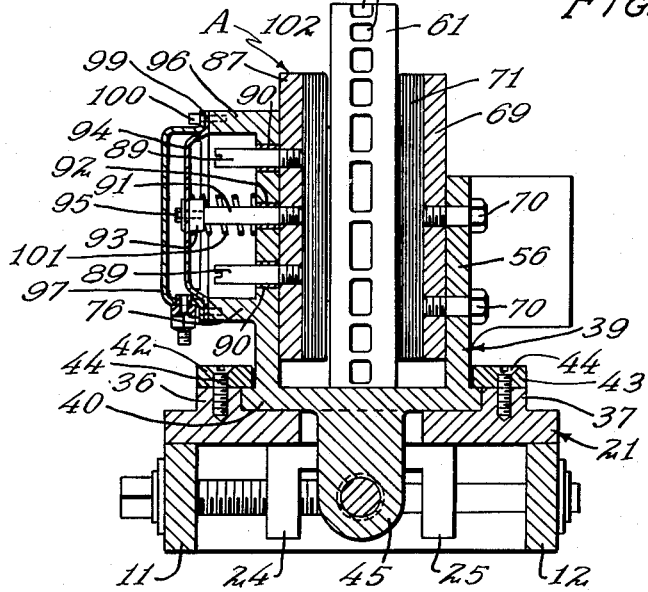
Figure 5:
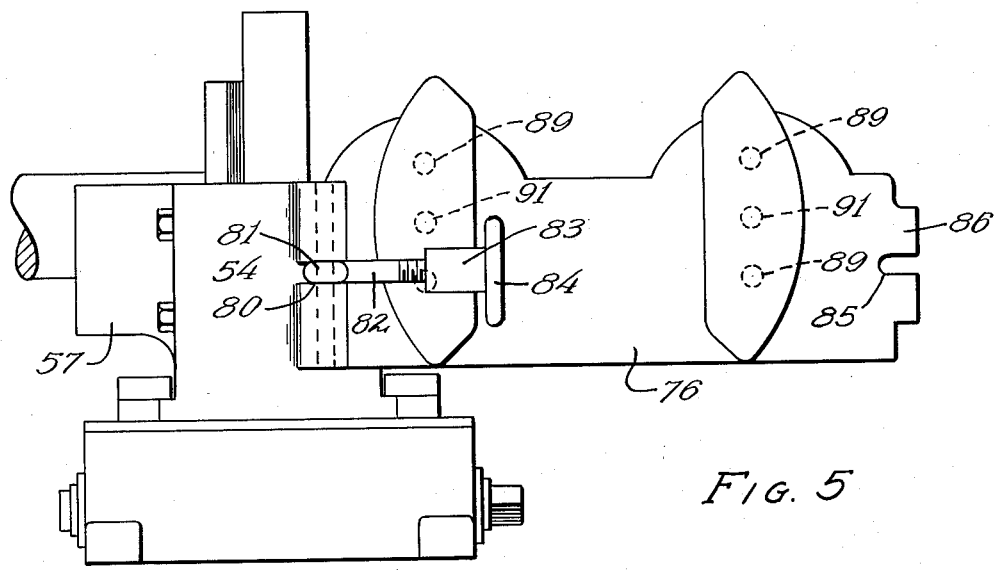
Figure 6:
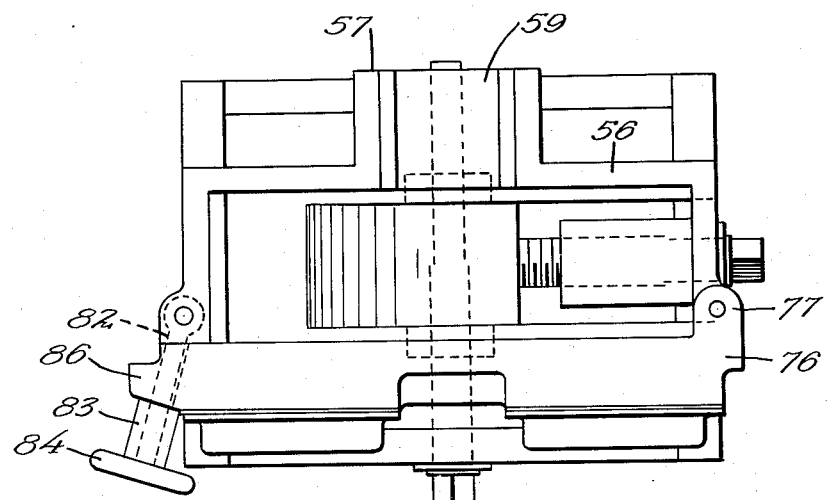
Figure 7:
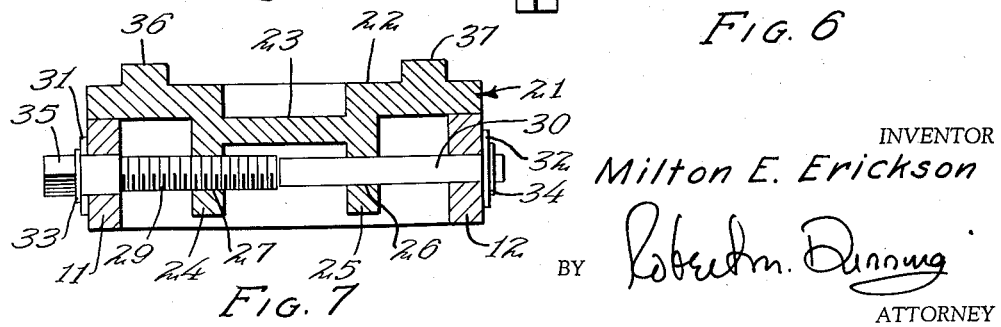

In the drawings forming a part of the specification:
FIGURE 1 is an end elevational view of the disc brake showing the general arrangement of parts.
FIGURE 2 is a side elevational view of the brake illustrated in FIGURE 1.
FIGURE 3 is a vertical sectional view through the brake, the position of the section being indicated by the line 3—3 of FIGURE 2.
FIGURE 4 is a vertical section through a portion of the disc brake, the position of the section being indicated by the line 4—4 of FIGURE 1.
FIGURE 5 is a side elevational view of the opposite side of the brake from that shown in FIGURE 2, showing the hinged side of the brake in open position.
FIGURE 6 is a top plan view of the brake in closed position.
FIGURE 7 is a sectional view through the base of the brake and the lower carriage slidably supported thereupon.

The disc brake is illustrated in general by the letter A. The brake includes a supporting base frame 10 which, in general, comprises a hollow rectangular frame having rectangularly arranged front and rear walls 11 and 12 and parallel sides 13 and 14. The sides 13 and 14 are provided with outwardly projecting mounting lugs 15 and 16, preferably at the corners of the frame 10 which are drilled to accommodate mounting bolts such as 17 for supporting the base 10 upon a suitable flat surface.

The sides 13 and 14 are provided with upwardly projecting parallel guide flanges 19 and 20 respectively which project above the level of the front and rear walls 11 and 12. A lower carriage 21 is slidably supported upon the upper edges of the side and end walls 11, 12, 13 and 14 and are restricted in lateral movement by the flanges 19 and 20 against which they abut. As indicated in FIGURES 3 and 7 of the drawings, the carriage 21 includes a flat upper surface 22 having a recessed central portion 23 to provide clearance for the brake drum which will be later described. A pair of parallel ears 24 and 25 depend in spaced relation from the undersurface of the carriage 21, the ear 25 being apertured as indicated at 26 and the ear 24 being provided with a threaded aperture 27 to accommodate the threaded end 29 of the adjustment screw 30. Washers 31 and 32 encircle the adjustment screw 30 outwardly of the frame walls 11 and 12 respectively and these washers are held in place by lock rings or cotter pins 33 and 34 to restrain the adjustment screw 30 from longitudinal or axial movement relative to the frame 10. The adjustment screw 30 is provided with a squared end 35 which may be engaged by a suitable wrench for rotating the adjustment screw. Upon rotation of the screw 30, the carriage 21 may move in a forward or rearward direction or parallel to the axis of the brake drum or disc as will be later described.

The upper surface 22 of the lower carriage 21 is provided with a pair of spaced parallel flanges 36 and 37 which act as guides to support the upper carriage which is indicated in general by the numeral 39. The carriage 39 includes a bottom plate 40, two edges of which engage the inner surfaces of the flanges 36 and 37. Strips 41 and 42 are mounted upon the upper surfaces of the flanges 36 and 37 and are held in place by suitable machine screws 44, the strips 42 and 43 overlying the edges of the slidable plate 40 and holding the upper carriage 39 slidably supported upon the lower carriage 21. The plate 40 is shown in FIGURES 3 and 4 as having an integral downturned ear 45 which extends through a slot or opening 46 in the base plate 22 of the lower carriage 21. The adjustment screw 47 extends through an internally threaded aperture 49 in the ear 45 and extends through the side wall 14 of the base 10. Washers 50 encircle the reduced diameter end 51 of the adjustment screw 47 which extends through the wall 14. The inner washer 50 is held in place by engagement against the larger diameter threaded portion of the adjustment screw 47 and the outer washer 50 is held in place by a locking ring 52 or cotter pin. The exposed end of the adjustment screw 47 is squared as indicated at 53 so that this screw may be rotated by a suitable wrench. Rotation of the adjustment screw 47 will act to move the upper carriage 39 in a lateral direction at right angles to the axis of the supported brake drum which will be later described.

The upper carriage 39 includes spaced parallel side walls 54 and 55 which are connected by a rear wall 56. As indicated in FIGURES 2 and 5 of the drawings, as well as in FIGURE 6, a hollow semi-cylindrical sleeve segment projects rearwardly from the center of the rear wall 56, the upper surface of this sleeve segment being flush with the upper surface of the rear wall 56. A semi-cylindrical sleeve bearing 59 is supported within the projection 57 of proper diameter to accommodate a roll supporting shaft 60. The shaft 60 supports a brake drum or disc 61 preferably cored to provide apertures 62 in its outer periphery to assist in the dissipation of heat. Rigid brake shoe supports 69 are bolted or otherwise secured to the fixed side 56 of the upper carriage 39 by bolts 70 or other suitable fastening means. Brake shoes 71 are secured to the brake shoe supports 69 in any suitable manner and are designed to engage against the rear surface of the brake drum or disc 61. The brake disc is urged against the brake shoes 71 by opposed brake shoes which will be later described.

From the foregoing description it will be seen that a brake drum housing is provided which may be adjusted in a direction axially of the shaft 60 or in a horizontal direction at right angles thereto. In order to assist in holding the parts assembled, the upper surface of the base plate 22 of the lower carriage 21 is notched as indicated at 73 along its side edges and anchoring plates 74 are secured to the upper surfaces of the side walls 13 and 14 overlying the flanges 19 and 20 and are secured thereto in any suitable means, not illustrated, to hold the lower carriage slidably supported upon the base 10. As indicated in FIGURE 2 of the drawings, the side wall 55 is provided with a hinge projection 75 which projects forwardly from the upper portion of the wall 55. As indicated in FIGURES 2 and 6 of the drawings, a front wall 76 is provided with spaced rearwardly extending hinge lugs 77 designed to accommodate the hinge lugs 75 therebetween. A hinge pin 79 extends through the lugs 75 and 77 to hingedly connect the front wall 76 to the housing side 55. As is seen in FIGURE 5 of the drawings, the side wall 54 is notched between its upper and lower edges as indicated at 80 to accommodate the eye 81 of an eye bolt 82. A sleeve 83 is threaded upon the eye bolt 82 and is provided with a peripherally notched handle 84 by means of which the sleeve may be rotated. The eye bolt 82 is engageable in a notch 85 at the free end of the front wall 76 when the front wall is hinged into closing position. FIGURE 6 illustrates the manner in which the collar 83 engages the bifurcated end 86 of the front wall 76 to hold the front wall in closing position. Brake shoe supports 87 are mounted upon the hinged front wall 76 in opposed relation to the brake shoe supports 69. A pair of studs 89 are threaded into the brake shoe supports in parallel relation and extend through bearings 90 in the hinged wall 76. A third stud 91 is also threaded into the brake shoe supports 87 between the studs 89 and extends through a central bearing 92 in the wall 76. A bearing collar 93 is provided near the end of the stud 91 and a diaphragm 94 is secured against the collar 93 by means of a suitably positioned bolt 95. As indicated in FIGURES 1 and 2 of the drawings, the hinged wall 76 is provided with a pair of hollow cylindrical enclosures 96 projecting forwardly from the wall 76 when this wall is in closed position. The diaphragm 95 is marginally sealed against the end of the sleeve 96 by a cup shaped enclosure 97 having a peripheral flange 99 which is bolted as indicated at 100 to the cylindrical enclosure 96. Thus, an air chamber is provided between the cup shaped enclosure 97 secured to each of the cylindrical enclosures 96 and the diaphragm 94 which is enclosed therein.

A spring 101 is interposed between the front wall 76 at the base of each cylindrical enclosure 96 and the corresponding diaphragm 94, tending to urge the brake shoe supports 87 forwardly against the front wall 76. The brake shoe supports 87 support brake shoes 102 which are engageable with the forward side of the brake drum or disc 61 in opposed relation to the brake shoes 71 on the rear wall of the upper carriage 39.

As is perhaps best illustrated in FIGURE 1 of the drawings, a tubular nipple 103 communicates with the interior of the cup shaped enclosure 97 on each side of the center of the brake drum. These nipples 103 are connected by suitable fittings 104 and 105 to an air pressure line 106 which is connected to a suitable source of compressed air or other compressed fluid, or fluid under pressure.

The operation of the apparatus is believed quite clear from the foregoing description. The base 10 is mounted upon a suitable support on one side of the path of movement of the web and a suitable bearing is provided on the other side of the path of movement of the web to support the other end of the shaft 60. The shaft 60, together with the brake drum 61 is inserted into the roll of paperboard or other suitable material and wedged in place so that the roll will rotate in unison with the shaft. The spaced hooks from an overhead hoist encircle the shaft on opposite sides of the roll and are used to lift the shaft and roll and move it into position over the bearings with the brake drum or disc 61 over the open topped enclosure of the upper carriage 39. The front wall 76 of this enclosure is swung open so as to avoid interference with the brake drum as it is lowered into place.

As the shaft and roll is lowered into the bearing 59 and the opposite bearing which is not illustrated in the drawing but which is designed to support the other end of the shaft 60, the brake drum 61 enters the enclosure forwardly of the brake shoes 71. Due to the fact that the forward wall of the enclosure is swung out of place during this time, the brake drum can be dropped down into the open top of the upper carriage 39 with little difficulty and in considerably less time than would be required to drop the brake drum between the opposed sets of brake shoes if the hinged forward side 76 were left closed. As the brake drum reaches its lowermost position, the shaft may be moved axially by the hoist so that the brake drum is closely adjacent to the fixed brake shoes 71. The hoist is then removed, the hinged side 76 swung into closed position, and the eye bolt 82 may swing into position to bring the collar 83 forwardly of the bifurcated end 86. The collar 83 may then be tightened by rotation of the handle 84 and the device is in readiness for operation.

The pressure against the brake drum or disc 61 may be regulated by regulating the fluid pressure acting against the diaphragm 94. The brake shoes 102 engage against one side of the brake drum moving the shaft axially and urging the brake drum against the opposed brake shoes 71 so that the braking pressing is equalized on opposite sides of the drum.

If the shaft is slightly out of parallel with the other shafts of the drums over which the web is trained, the upper carriage 39 may be moved forwardly or rearwardly to correct this error. As the adjustment is normally rather slight, the adjustment can be made without misaligning the shaft 60 in its bearings and when the shaft 60 is in parallel with any of the other shafts, the bearings are also substantially aligned. Axial adjustment of the shaft may be obtained by rotation of the adjustment screw 29 to move the lower carriage 21 in the desired direction.

In accordance with the patent statutes, I have described the principles of construction and operation of my improvement in disc brake, and while I have endeavored to set forth the best embodiment thereof, I desire to have it understood that changes may be made within the scope of the following claims without departing from the spirit of my invention.

I claim:

1. A disc brake including a shaft, a brake drum supported upon said shaft for rotation therewith, an open topped enclosure into which said brake drum may be lowered, a supporting bearing on one side of said enclosure for said shaft, brake shoes on said one side of said enclosure engageable against the surface of said drum, said enclosure including a hinged side opposite said one side, brake shoes movably supported on said hinged side in opposed relation to said first named brake shoes, and means for moving said last named brake shoes toward and away from said drum relative to said hinged side.

2. The construction described in claim 1 and in which said means for moving said brake shoes toward and away from said brake drum includes diaphragm means connected to said last named brake shoes, an enclosure encircling said diaphragm means, and pressure means connected to said enclosure for moving said diaphragm means.

3. The construction described in claim 1 and in which said brake shoes supported by said hinged side comprise a pair of brake shoes on opposite sides of the axis of said brake drum, a diaphragm connected to each brake shoe, an enclosure encircling each diaphragm, and a source of pressure connected to said enclosures for moving said diaphragms.

4. The construction described in claim 1 and including means for adjustably supporting said open topped enclosure.

5. The construction described in claim 1 and including adjustable means for supporting said open topped enclosure for movement axially of said brake drum and for movement horizontally at right angles to the axis of said brake drum.

6. A disc brake for use in combination with a brake drum and a brake drum supporting shaft, the brake including a hollow topped enclosure provided with a hinged wall at one side, an open topped bearing supported by the opposite side of said enclosure for supporting an end of the shaft, said enclosure being adapted to accommodate the lower portion of the brake drum, an upper carriage connected to said enclosure, a lower carriage supporting said upper carriage for movement in a horizontal direction at right angles to the axis of said drum, a base supporting said lower carriage for movement in a direction axially of said drum, and means for adjusting the position of said carriage relative to said base.

7. The construction described in claim 6 and in which said wall is hinged at one end at a location spaced radially outwardly from the periphery of said drum, threaded means located diametrically opposite said hinged end for maintaining said wall in a closed position, brake shoe means carried on said hinged wall for engaging said drum, and yieldable means also carried by said hinged wall for actuating said shoe means into engagement with said drum.

8. A disc brake including a base, a carriage slidably supported on said base for movement in one horizontal direction, a second carriage mounted upon said first carriage and slidably supported for movement in a direction at right angles to the direction of movement of said first carriage, a generally rectangular open topped receptacle on said second carriage and movable therewith, means connecting said base to said first and second carriages for adjusting the position thereof, a brake drum, an open topped bearing on one side of said open topped receptacle, a brake drum shaft engageable in said open topped bearing to rotatably support said brake drum in said receptacle, fixed brake shoes on said one side of said receptacle, means hingedly supporting the side of said open topped receptacle opposite said one side, second brake shoes movably supported by said hinged side in opposed relation to said first named brake shoes, and means for moving said second brake shoes toward and away from said brake drum relative to said hinged side.

9. The construction described in claim 8 and in which said means for moving said last named brake shoes comprises fluid actuated means.

10. The construction described in claim 8 and in which one of said carriages moves in a direction parallel to the axis of said brake drum and the other of said carriages is movable in a direction at right angles to the axis of said brake drum.

References Cited in the file of this patent

UNITED STATES PATENTS

| | | |
|---|---|---|
| 1,281,269 | Axilrod | Oct. 15, 1918 |
| 2,321,329 | Stafford et al. | June 8, 1943 |
| 2,525,600 | Hornbostel | Oct. 10, 1950 |
| 2,830,679 | Butler | Apr. 15, 1958 |
| 2,830,681 | Schilling | Apr. 15, 1958 |